United States Patent [19]
Eda

[11] Patent Number: 5,062,155
[45] Date of Patent: Oct. 29, 1991

[54] MODULATED LIGHT WAVE DEMODULATOR

[75] Inventor: Kazuo Eda, Nara, Japan

[73] Assignee: Matsushita Electric Industrial Co., Ltd., Osaka, Japan

[21] Appl. No.: 464,000

[22] Filed: Jan. 12, 1990

[30] Foreign Application Priority Data

Jan. 12, 1989 [JP] Japan .................................. 1-5232

[51] Int. Cl.⁵ ........................ G02F 1/00; H01S 3/00; G02B 5/23
[52] U.S. Cl. ................................ 359/189; 359/325; 359/515; 359/528; 359/629
[58] Field of Search ............... 455/617, 619, 606, 607, 455/605, 611, 613; 350/354, 3.64, 97, 101, 104, 102, 169, 170; 372/3; 250/201.9

[56] References Cited

U.S. PATENT DOCUMENTS

| 4,529,273 | 7/1985 | Cronin-Golumb et al. | 350/354 |
| 4,953,954 | 9/1990 | Ewbank et al. | 370/4 |

OTHER PUBLICATIONS

"Spectral Characteristics of External-Cavity Controlled Semiconductor Lasers", Fleming et al., IEEE Journal of Quantum Electronics, vol. QE-17, No. 1, Jan. 1981, pp. 44-59.
"Phase Conjugate Optics and Real-Time Holography", A. Yariv, IEEE Journal of Quantum Electronics, vol. QE-14, No. 9, Sep. 1978, pp. 650-660.
"CW Operation of Distributed-Feedback GaAs-GaAlAs Diode Lasers at Temperatures up to 300K", Nakamura et al., Applied Physics Letters, vol. 27, No. 7, Oct. 1975, pp. 403-405.
"Active Optics: A New Technology for the Control of Light", John W. Hardy, Senior Member, IEEE; Proceeding of the IEEE, vol. 66, No. 6, Jun. 1978, pp. 654 to 655.

*Primary Examiner*—Joseph A. Orsino
*Assistant Examiner*—Franklin V. Nguyen
*Attorney, Agent, or Firm*—Wenderoth, Lind & Ponack

[57] ABSTRACT

A modulated light wave demodulator includes an external cavity type laser having a 4-light wave mixing optical phase conjugate element for inverting the spatial phase of an incident light and a light mixing detector. At least part of a modulated light wave, carrying information to be transmitted, is input as a probe light into the optical phase conjugate element and reacts with a laser light wave to produce a phase conjugate light wave, and the phase conjugate light wave and the laser light wave are subjected to a light mixing detection by a light mixing detector to obtain a demodulated light wave. Alternatively, the intensity of the phase conjugate light wave emitted from the optical phase conjugate element is detected and the modulated light wave and the laser light wave are subjected to a light mixing detection by the light mixing detector when the detected intensity of the phase conjugate light wave becomes maximum, so as to thereby obtain a demodulated light wave.

4 Claims, 3 Drawing Sheets

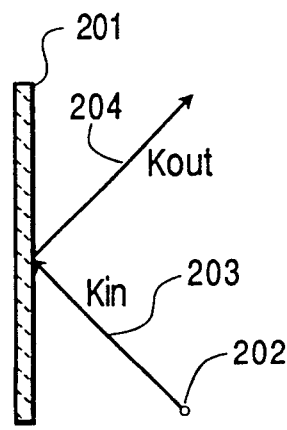
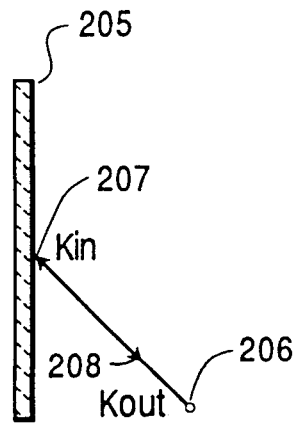
FIG. 2(A)  FIG. 2(B)
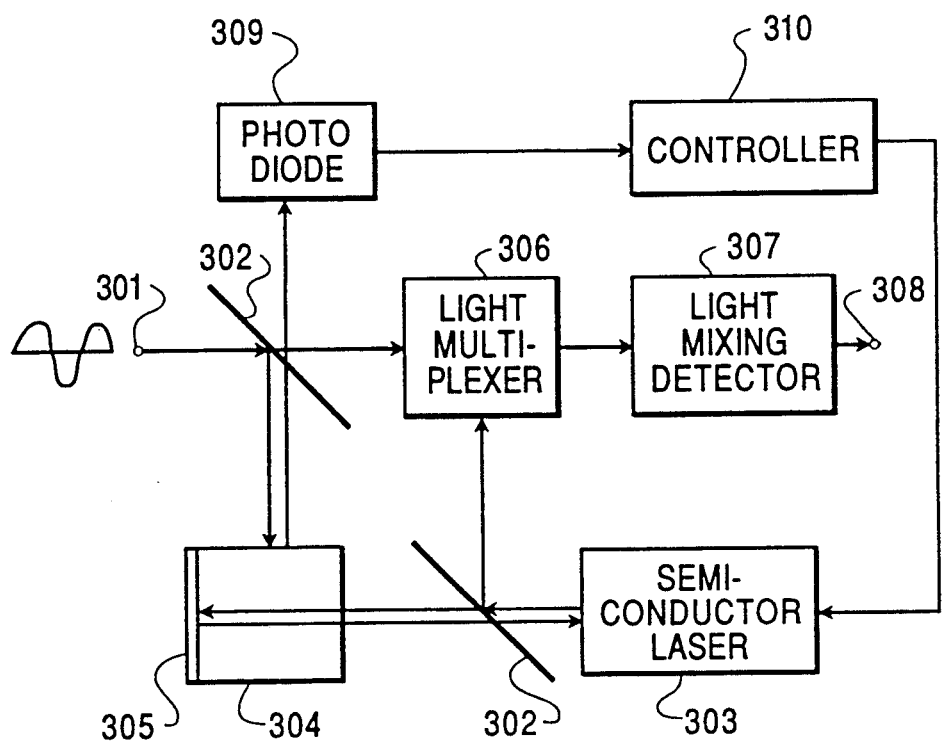
FIG. 3

MODULATED LIGHT WAVE DEMODULATOR

BACKGROUND OF THE INVENTION

1. Field of Invention

This invention concerns a modulated light wave demodulator for demodulating a light wave, useful for wave-length multioptical communications and coherent optical communications making use of light waves with well-arranged spatial phases, that is to say, coherent light waves.

2. Description of the Prior Art

The coherent optical communication technology which transmits signals through modulating the frequency and phase of a light wave with well-arranged spatial phases, that is to say, coherent light waves, is expected to be the communication technology of the next generation because of its capability for the transmission of a great volume of signals at a long distance. However, no good device, or demodulator has been found for demodulating a modulated light wave. There is a need for a cheaper modulated light wave demodulator with a high accuracy in the wave length of the optical carrier wave and stable tuning capability.

FIG. 4 shows a structure of a conventional modulated light wave demodulator in a current coherent optical communication system. In FIG. 4, element 401 is a modulated light wave; element 402 is an optical fiber to transmit the modulated light wave; element 403 is a light multiplexer; element 404 is a distributed feedback (DFB) semiconductor laser; element 405 is a light mixer composed of PIN photodiodes; element 406 to an intermediate frequency amplifier; element 407 to a filter, and element 408 is to a controller for controlling the semiconductor laser 404.

Next, the operation of this device is described. The laser light wave generated by the semiconductor laser 404 for use as a local oscillator light wave is multiplexed with the modulated light wave 401 carrying information to be transmitted in the form of frequency modulation or phase modulation by the light multiplexer 403. If the wave length of the signal light carrier wave is extremely close to the wave length of the local oscillator light wave, a beat signal is generated in the multiplexed wave. If the beat signal becomes an appropriate intermediate frequency, it is amplified by the intermediate frequency amplifier 406, and thereafter processed in the same way as with ordinary frequency modulation (FM) signals, to demodulate the modulated wave. Tuning is conducted by feeding back the signal obtained through the filter 407 to the controller 408 to control the input current volume of the laser 404. However, in order to increase the accuracy of tuning detection, a stable laser with an extremely narrow spectrum width of its generated light wave length is necessary to use the laser as a light source of local oscillator light waves.

As such, the DFB laser using a waveguide type diffraction grating as the reflector for optical resonance of the semiconductor laser is used. An example for the continuous operation made first at the room temperature was reported by M. Nakamura in Applied Physics Letters, Vol. 27, No. 7, pp 403–405 (1975), "CW operation of distributed-feedback GaAs-GaAlAs diode lasers at temperatures up to 300K".

FIG. 5 shows a structure of the typical conventional DFB laser. In the figure, element 501 is indicates a laser oscillator; element 502 a light waveguide; element 503 is a waveguide type diffraction grating; element 504 is a surface of open section to be the reflector for optical resonance on the laser light emission side, and element 505 is a substrate. The light generated by recombination of electrically injected electrons and holes at the laser oscillator 501 enters the waveguide type diffraction grating 503 through the optical waveguide 502. The entered light interferes with the diffraction grating here, and only the light of a wave length having a certain relationship to the period of the diffraction grating is reflected. The reflected light returns to the optical waveguide portion again, is reflected once more by the ordinary reflector 504 formed on the other end surface of the laser oscillator, and after all, the optical resonator is formed with the waveguide type diffraction grating 503 and the reflector 504. Accordingly, the resonance wave length is fixed with the period of the diffraction grating and stable so that the laser of the narrow spectrum width of its generated light wave length may be obtained. In addition, also known is the external cavity type semiconductor laser for which the ordinary optical diffraction grating is installed outside instead of the waveguide type diffraction grating. This diffraction grating is used as a reflector at one side of optical resonance. A typical example is described by M. Fleming, et al. in "Spectral Characteristics of External-Cavity Controlled Semiconductor Lasers", IEEE Journal of Quantum Electronics, Vol. QE-17, No. 1, pp 44–59 (1981).

There are found some problems in the above-mentioned modulated light demodulator. First, the performance of the semiconductor laser used as a local oscillator is not sufficient. Therefore, it is difficult to tune well to the wave length of the carrier wave of the modulated light. The waveguide type diffraction grating is used for the DFB type semiconductor lasers, but the wavelength selection performance is not sufficient such that the spectrum width of the generated light wave length is not narrow enough. For the external cavity type semiconductor laser, a diffraction grating with a good wave-length selection performance can be used, but it must be fixed mechanically with an accurate optical axis adjustment because of being distant in space, so that it may be difficult to adjust the optical axis precisely, and even if accurately adjusted and mounted once, it is difficult to produce a practically stable laser because of thermal expansion and contraction caused by temperature changes or displacement caused by mechanical vibrations. The spectrum width of the generated light wave length is stable when the spatial distance is lengthened, but in such condition the more likely the above-mentioned mechanical changes takes place. Accordingly, the external cavity type semiconductor laser does not likewise have a sufficient performance.

Secondly, because the wavelength-division-multiplexing communication systems and coherent optical communication systems multiplex light waves, it will be desirable that the wider range of the wave length of the optical carrier wave be available. However, the variable range of the wavelength is narrow in the above-mentioned DFB semiconductor laser. Therefore, the tuning range of the wavelength is narrow.

Furthermore, the use of a tuning filter makes the structure of the device complex.

In the conventional devices as described above, the spectrum width of the generated light wave length is narrow and there is no available semiconductor laser which is stable during changes in the surrounding environmental conditions and with the wide variable range of wavelength, and therefore, no cheap modulated light wave demodulator with a high and stable tuning accuracy and a wide tuning range has been found.

SUMMARY OF THE INVENTION

An object of this invention is to provide a cheap modulated light wave demodulator with a high and stable tuning accuracy and a wide tuning range.

In order to achieve this object, this invention provides a cheap modulated light wave demodulator with a high and stable tuning accuracy and a wide tuning range, comprising an external cavity type laser having a 4-light wave mixing optical phase conjugate element with for inverting the spatial phase of an incident light, and a light mixing detector. At least a part of a modulated light wave, carrying information to be transmitted, is input as a probe light into the optical phase conjugate element and reacts with a laser light wave to produce a phase conjugate light wave, and the phase conjugate light wave and the laser light wave are subjected to a light mixing detection by a light mixing detector to obtain a demodulated light wave. Alternatively, the intensity of the phase conjugate light wave emitted from the optical phase conjugate element as above is detected, and the modulated light wave and the laser light wave are subjected to a light mixing detection by the light mixing detector when the detected intensity of the phase conjugate light wave becomes maximum, so as to thereby obtain a demodulated light wave.

The phase conjugate light wave is generated only when the wave length of the carrier wave of the modulated light wave corresponds to the wave length of the semiconductor laser generated light wave. Accordingly, the tuning to the modulated light wave can be easily and stably conducted by detecting the phase conjugate light wave or by mixing with the phase conjugate light wave.

BRIEF DESCRIPTION OF THE DRAWINGS

FIGS. 2(A) and 2(B) are diagrams used for describing the operation of an optical phase conjugate element used in this invention;

FIG. 3 is a diagram of another embodiment of the optical tuning device of this invention;

DESCRIPTION OF THE PREFERRED EMBODIMENTS

Figure 1:
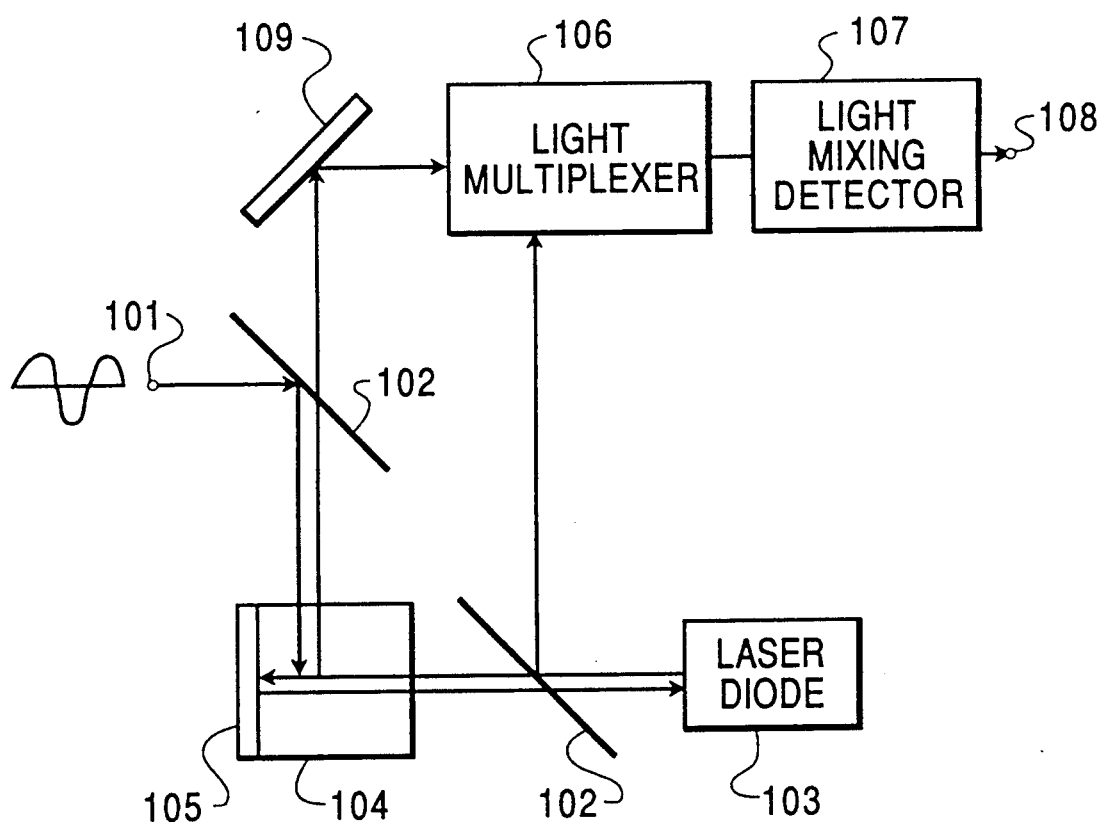
FIG. 1 shows a diagram of a structure of an embodiment of the modulated light wave demodulator in accordance with the present invention.
Figures 4, 5:
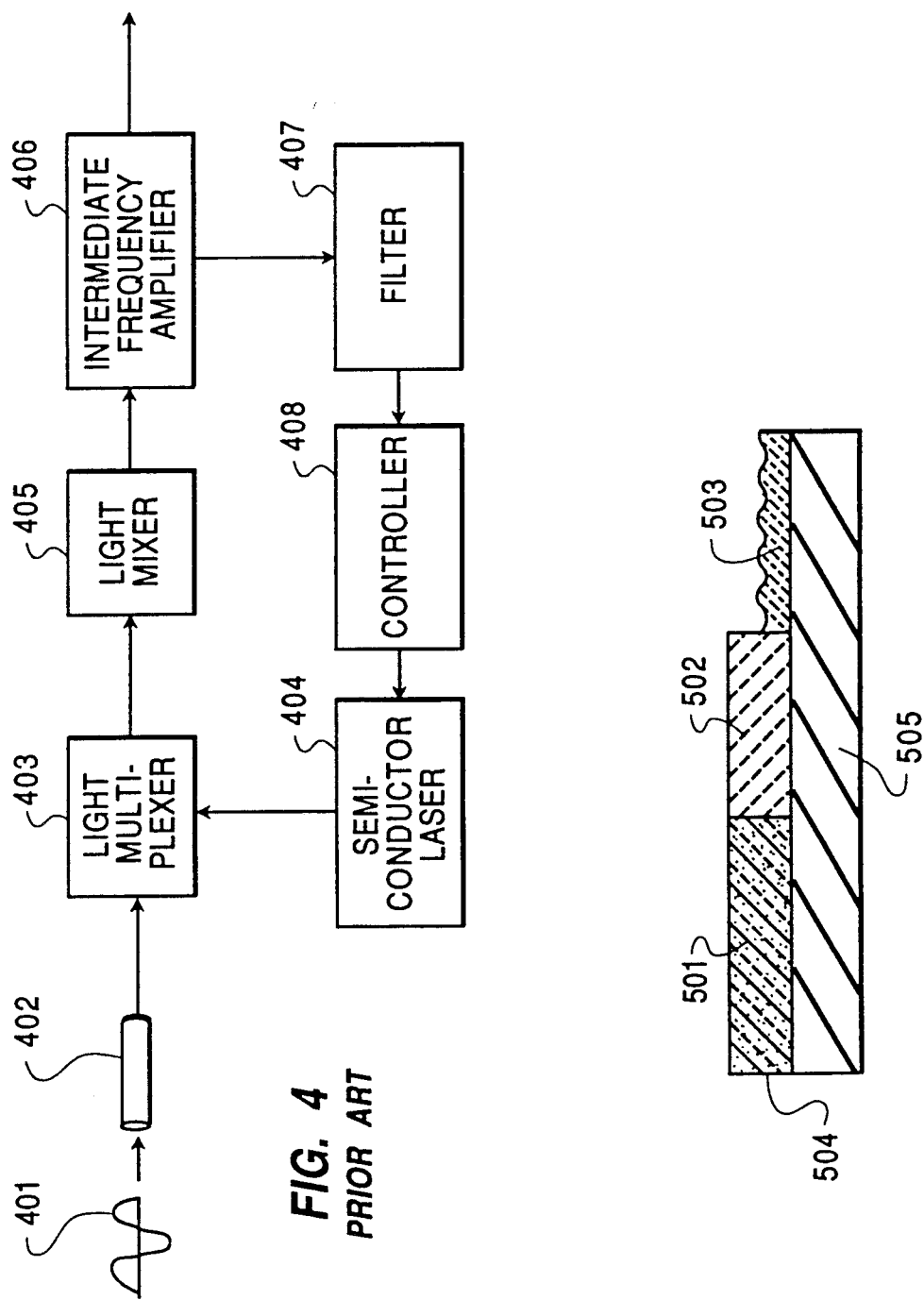
FIG. 4 is a diagram of a conventional modulated light wave demodulator.
FIG. 5 is a diagram of a structure of a semiconductor laser used in the conventional modulated light wave demodulator.

FIG. 1 shows a structure of an embodiment of the modulated light wave demodulator in accordance with the present invention. In the figure; element 101 is a modulated light input terminal; elements 102 are semi-transparent mirrors; element 103 is a semiconductor laser for local oscillation; element 104 is a 4-light wave mixing optical phase conjugate element into which the laser light emitted from the semiconductor laser 103 enters as a pump light; element 105 is a reflection mirror for reflecting the first pump light in the opposite direction to form a second pump light; element 106 is a light multiplexer; element 107 is a light mixing detector composed of PIN photodiodes; element 108 is a signal output terminal, and element 109 is an ordinary reflection mirror.

The optical phase conjugation is described briefly. The optical phase conjugation and its typical application are described, for example, by A. Yariv in "Phase Conjugate Optics and Real-Time Holography", IEEE Journal of Quantum Electronics, QE-14, No. 9, pp 650–660, (1978).

The optical phase conjugate element is an element acting to invert the direction and all wave fronts of a light wave propagating in an optional direction. FIGS. 2(A) and 2(B) show the all wave front inverting action by the optical phase conjugate element in comparison with the ordinary mirror. In FIG. 2(A), element 201 is an ordinary mirror; element 202 is a light source "Kin" of wave 203 is the wave number vector of the input; light "Kout" of wave 204 is the wave number vector of the output light reflected from the mirror, and in FIG. 2(B), element 205 is an optical phase conjugate element; element 20b is a light source "Kin" of wave 207 is the wave number vector of the input light, and "Kout" of wave of is the wave number vector of the output light from the optical phase conjugate element.

FIG. 2(A) shows the conditions of light to be reflected by the ordinary mirror, and in the ordinary mirror, the reflected light is emitted to the opposite side with respect to the plane perpendicular to the mirror surface at an angle of reflection which is the same as the angle of incidence. FIG. 2(B) shows the case of the optical phase conjugate element, and in this case, there is generated a wave which proceeds on the same path as the light of incidence but in the reverse direction. That is to say, the optical phase conjugate element generates a wave having the sign of the wave number vector inverted, i.e. a wave having the relationship of Kin = −Kout. Such an relationship can be obtained only in a very special case. As one method, a method of 4-light wave mixing is known. This is a method in which three light waves of the same frequency are inputted into a particular medium to form a third-order non-linear polarization, which becomes a new wave source for generating the forth light wave from the medium. In this case, supposing that of the three light waves to be inputted into the medium, two are pump waves Ep1 and Ep2 and the other one is a probe wave Epr, and the emitting optical phase conjugate wave is Epc, and the respective wave number vectors thereof are Kp1, Kp2, Kpr and Kpc, then the phase matching condition of:

$$Kp1 + Kp2 = Kpr + Kpc$$

must to be satisfied in order to generate the optical phase conjugate wave. If a relationship: Kp1+Kp2=0 is satisfied between the pump waves, Kpr+Kpc=0 can be obtained, and a relationship: Kpr=−Kpc can be always obtained, i.e., the optical phase conjugate wave can be generated. The relationship: Kp1+Kp2=0 can be obtained by arranging two light sources of the same wave length to oppose to each other. It can be also obtained when a single light source is used and the light emitted therefrom is reflected precisely in the right opposite direction by an ordinary reflection mirror. Accordingly, the optical phase conjugate element can be realized by using a material causing a large third-order non-linear polarization. As such a material, suitable are the electrooptical materials such as barium titanate, bismuth silicate, bismuth germanate and potassium niobate, and group III-V compound semiconductor materials such as gallium arsenic, aluminum-gallium arsenic, indium-antimony-indium-phosphorus, etc. If a multi-quantum well structure is formed by using a group III-V compound semiconductor, stable exciting elements can be formed up to a high temperature. Since the exciting elements increase the third-order electric polarization, an optical phase conjugate element with a higher efficiency can be formed.

Next, described is the operation of the embodiment using such an optical phase conjugate element as reflection mirror at one side of the optical resonator. In FIG. 1, the laser light wave emitted from the semiconductor laser 103 enters into the optical phase conjugate element 104 as the first pump light wave. The entered light wave is reflected in the right opposite direction by the reflection mirror 105 and becomes the second pump light wave. If the respective wave number vectors of the first and second pump light wave are named as Kp1 and Kp2, and the respective light wave are so positioned that they may proceed in the entirely opposite directions from each other, Kp1 = −Kp2 is realized. If the signal light wave 101 enters into the optical phase conjugate element 104 under this condition, only the phase conjugate wave of the same wave lengthwave as that of the pump light wave is emitted selectively. The phase conjugate light wave is generated only when the wavelengths of the probe light wave and the pump light wave correctly coincide. When the signal light wave is phase-modulated, the phase conjugate light wave also correctly has the phase modulation information. Therefore, if this phase conjugate light wave and the semiconductor laser light wave are multiplexed by the light multiplexer 106 and inputted into the the photodiode of the light mixing detector 107, then the modulated signal can be demodulated. Namely, with this embodiment of the invention, the signal light detection output can be obtained only when the oscillated laser light wave is tuned correctly to the wavelength of the carrier wave of the modulated light wave by sweeping the oscillated wave length of the semiconductor laser light wave. Accordingly, it is possible to tune to the modulated light automatically without needing complex circuits.

FIG. 3 shows the second embodiment of the modulated light demodulator in accordance with the present invention. In FIG. 3, element 301 is a modulated light input terminal; elements 302 are semitransparent mirrors; element 303 is a semiconductor laser for local oscillation; element 304 is a 4-light wave mixing optical phase conjugate element into which the above-mentioned semiconductor laser light wave enters as a pump light; element 305 is a reflection mirror for forming a second pump light wave by reflecting the first pump light in the right opposite direction element 306 a light multiplexer element 307 is a light mixing detector composed of PIN photo-diodes; element 308 is a signal output terminal; element 309 is a photo-diode acting as a phase conjugate light detector, and element 310 is a controller for the semiconductor laser 303.

The relationship between the semiconductor laser 303 and the optical phase conjugate element 304 is the same as the case in the first embodiment. Accordingly, the phase conjugate light wave is emitted only when the wavelengths of the modulated light wave and the oscillated semiconductor laser light wave coincide correctly. In the second embodiment, the intensity of this phase conjugate light wave is detected by the photodiode 309 and the oscillated wavelength of the semiconductor laser 303 is controlled and fixed by the controller 310 so that the intensity of the phase conjugate light wave is maximized. If the modulated light wave is multiplexed by the multiplexer 306 with the wave of the oscillated light wave of the semiconductor laser and subjected to light mixing detection by the detector 307 under this condition, the optical modulated wave can be demodulated. By detecting the intensity of the phase conjugate light wave like this, the oscillated wavelength of the semiconductor laser (the local oscillated light wave) can be tuned to the wavelength of the modulated light carrier wave. In this case, there is an advantage that the generating efficiency of the phase conjugate light wave of the phase conjugate element may be low.

This invention with the structure and operating principle as described above provide the following effects:

In any embodiment, it can be conducted easily and stably to tune to the modulated light wave by detecting the phase conjugate light wave or conducting the multiplexing with the phase conjugate light wave because the phase conjugate light wave is generated only when the wavelengths of the carrier wave of the modulated light wave and the semiconductor laser oscillated light wave coincide correctly.

In the first embodiment, the structure is very simple because the signal output can be obtained only when tuned because the phase conjugate light wave and the semiconductor laser light wave are directly mixed and detected.

In the second embodiment also, the selection allowance of the optical phase conjugate element increases and is of advantage in the practical use because the generating efficiency of the phase conjugate light wave of the optical phase conjugate element may be low. For instance, cheap materials can be usable.

In the above description, only typical optical systems are shown, but they are merely for examples. It is possible that the number of the reflection mirrors can be increased, that optical fibers can be used and that the optical system can be composed using optical waveguide paths.

What is claimed is:

1. A demodulator for demodulating a modulated light wave carrying information, comprising:
   an external cavity type laser comprising a semiconductor laser element for emitting a laser light wave, and an external cavity comprising a reflector for reflecting said laser light wave emitted from said laser element to produce a reflected laser light wave returning to said laser element, and a four-light wave mixing optical phase conjugate element arranged to pass therethrough said emitted laser light wave and said reflected light wave as pump light waves and at least a part of said modulated light wave as a probe light wave for producing a phase conjugate light wave having a spatial phase inverted with respect to that of said modulated light wave when a wavelength of said emitted laser light wave is the same as that of said modulated light wave; and
   a light mixing detector for subjecting said phase conjugate light wave and said emitter light wave to light-mixing detection to obtain a demodulated light wave carrying said information.

2. A demodulator according to claim 1, wherein said laser element is arranged such that the wavelength of said emitted laser light wave is variable.

3. A demodulator for demodulating a modulated light wave carrying information, comprising:

an external cavity type laser comprising a semiconductor laser element for emitting a laser light wave, and an external cavity comprising a reflector for reflecting said laser light wave emitted from said laser element to produce a reflected laser light wave returning to said laser element, and a four-light wave mixing optical phase conjugate element arranged to pass therethrough said emitted laser light wave and said reflected light wave as pump light waves and at least a part of said modulated light wave as a probe light wave for producing a phase conjugate light wave having a spatial phase inverted with respect to that of said modulated light wave when a wavelength of said emitted laser light wave is the same as that of said modulated light wave;

a light intensity detector for detecting an intensity of said phase conjugate light wave;

a controller responsive to the detected intensity of said phase conjugate light wave detected by said light intensity detector for controlling said laser element so that said intensity of said phase conjugate light wave is maximized; and a light mixing detector for subjecting said modulated light wave and said emitted laser light wave to light-mixing detection to obtain a demodulated light wave carrying said information when said intensity of said phase conjugate light wave is maximized.

4. A demodulator according to claim 3, wherein said laser element varies its emitted light wave wavelength under control of said controller so that said intensity of said phase conjugate light wave is maximized.

* * * * *